United States Patent
Okazaki et al.

[15] 3,642,574
[45] Feb. 15, 1972

[54] METHOD FOR PRODUCING VACCINE FOR IMMUNIZATION OF POULTRY AGAINST MAREK'S DISEASE

[72] Inventors: William Okazaki, East Lansing; H. Graham Purchase; Richard L. Witter, both of Okemos, all of Mich.;

[73] Assignee: The United States of America as represented by the Secretary of Agriculture

[22] Filed: Apr. 29, 1970

[21] Appl. No.: 33,060

[52] U.S. Cl....................................195/1.5, 195/1.1, 195/1.3, 424/89
[51] Int. Cl......................C12k 5/00, C12k 7/00, C12k 9/00
[58] Field of Search.........................195/1.1, 1.3, 1.5; 424/89

OTHER PUBLICATIONS

Witter, R. L. et al, Am. J. Vet. Res. *31* (3): 525-538 March 1970 "Isolation from Turkeys of a Cell-Associated Herpesvirus Antigenically Related to Marek's Disease Virus"
Okazaki, W. et al Avian Disgases *14* (2): 413-428 May 1970 "Protection Against Marek's Disease by Vaccination with a Herpesvirus of Turkeys"

*Primary Examiner*—Shep K. Rose
*Attorney*—R. Hoffman and W. Bier

[57] ABSTRACT

A vaccine is produced from a turkey herpesvirus which is nonpathogenic in chickens but immunizes against Marek's disease.

3 Claims, No Drawings

METHOD FOR PRODUCING VACCINE FOR IMMUNIZATION OF POULTRY AGAINST MAREK'S DISEASE

BACKGROUND OF THE INVENTION

This invention relates to the prevention of pathological effects of a disease of chickens known as Marek's disease (MD). More particularly, it relates to the production and use of a live virus vaccine for the immunization of chickens against the above-mentioned disease.

Marek's disease, a lymphoproliferative disease of chickens, was first described in 1907 and has become one of the most destructive poultry diseases. Annual loss in the United States of over $150 million has been attributed to "leukosis"-type diseases, MD being the most important type [AAAP Report, Avian Diseases 11: 694–702 (1967)].

Great effort has gone into characterizing MD [see review by P. M. Briggs, Current Topics in Microbiology and Immunology 43: 93–125 (1968)], and it has been shown that the disease is caused by a group B herpesvirus [Churchill et al., Nature 215: 528–530 (1967); Solomon et al., Proc. Soc. Exptl. Biol. Med. 127: 173–177 (1968); Nazerian et al., Proc. Soc. Exptl. Biol. Med. 127: 177–182 (1968)].

The problems of MD have generated considerable research into developing treatments and preventions. However, attempts at control by genetic, chemical, biological, and sanitation-isolation means have been ineffective (AAAP Report, supra, and Biggs et al., supra). However, immunoligical studies have shown promise. Kottaridis et al., Nature 221: 1258–1259 (1969), have shown that cells from chicken embryo fibroblast cultured with bone marrow from MD-infected chickens, when inoculated into day-old chicks, will cause an immune response. Churchill et al., Nature 221: 744–747 (1969), produced a vaccine consisting of a live attenuated MD virus from strain HPRS16 which had to go through at least 33 cell culture passages before the virus was attenuated and had lost its pathogenicity, but the virus had also lost all antigen A. The resulting vaccine is completely cell-associated.

We have produced a vaccine from a live virus that is nonpathogenic in nature, is not attenuated, has not lost its A antigen, can be rapidly grown to usable proportions in as few as nine cell culture passages, and affords essentially complete protection from MD when administered to chickens from 1–21 days old. The vaccine can also be made cell-free which makes storage much easier.

In accordance with the invention, a virus, designated Avian Herpesvirus IV (AHIV), also known as turkey herpesvirus (HVT), is used to inoculate a monolayer cell culture.

The just-mentioned turkey herpesvirus (HVT) was first disclosed publicly by Witter, Burgoyne, Nazerian, and Purchase at the 41st Northeastern Conference on Avian Diseases, University of Maine, Orono, Maine, June 23–25, 1969. In an abstract distributed at the conference, the turkey herpesvirus was designated as "THV". However, this was later changed to "HVT" because the former had already been preempted for the turkey hepatitis virus. The isolation and characterization, including the reasons for the change in designation from "THV" to "HVT," were subsequently described in detail by the same investigators in a paper entitled "Isolation from Turkeys of a Cell-Associated Herpesvirus Antigenically Related to Marek's Disease Virus," published in the American Journal of Veterinary Research, Vol. 31, No. 3, pages 525–538 Mar. 1970.

Inoculated cell cultures (e.g., chick kidney, chicken embryo fibroblast, and duck embryo fibroblast cultures) is incubated until most of the cells are infected by the virus. The cells are removed from the culture, separated with trypsin, and replated on fresh monolayers. In this way the virus is subjected to serial cell culture passages until a useful quantity of viruliferous cells is obtained. The cells in the final passage are dispersed with trypsin, separated from the culture medium, redispersed in culture medium containing from 5–10 percent dimethyl sulfoxide, and made up to a concentration of about $10^5$ to $10^7$ PFU per milliliter. Viruliferous cells, extracted from the turkey, used to inoculate the first cell culture are either in heparinized whole blood or from kidney tissue which has been washed with phosphate-buffered saline and dispersed with trypsin.

The vaccine produced as above is further processed by disrupting virus-infected cells suspended in culture medium and removing the disrupted cells from the medium which are characterized as essentially containing live, unattenuated, cell-free virus.

Vaccines produced as above are used to provide immunization against Marek's disease by administering the vaccines to chicks from 1 day to 3 weeks old.

DETAILED DISCUSSION OF THE INVENTION

Avian Herpesvirus IV (AHIV) from which the instant vaccine is produced was isolated from blood and kidney tissue samples of infected turkeys. Isolates designated as FC126 were from two 23-week-old turkeys in a flock in Indiana. Other isolates obtained were: AC16 from blood of a 16-week-old turkey in Georgia, AC18 from kidney tissue of an 18-week-old turkey in Indiana, and WTHV1 from kidney tissue of a turkey in Wisconsin. Serological studies, agar gel precipitin test (AGP), virus neutralization test (VN), and fluorescent antibody test (FA), demonstrate that the four AHIV isolates are antigenically indistinguishable but are distinct from Marek's disease herpesvirus (MDHV), Table 1.

Witter et al., (ibid., page 536) point out that the recovery of HVT from three turkey flocks in Indiana and Georgia and the simultaneous isolation of an apparently identical virus from turkeys in Wisconsin indicates that HVT may be widespread in turkey flocks. The ability of the virus to spread horizontally among turkeys and its apparent lack of pathogenicity are factors for perpetuation of the virus in the population. Although large numbers of chickens have been tested for herpesviruses (Avian Diseases, Vol. 13 (1969); pages 171–184), viruses with characteristics typical of HVT were not isolated.

TABLE 1

| Sera [1] | Antigens [2] | | | | | |
|---|---|---|---|---|---|---|
| | FC126 | | | MDHV | | Control |
| | AGP | VN [4] | FA | AGP | FA | AGP and FA [3] |
| Hyperimmune: | | | | | | |
| FC126 (c) | + | + | ++ | − | + | − |
| AC16 (c) | + | + | ++ | − | + | − |
| AC18 (c) | + | + | ++ | − | + | − |
| WTHV1 (c) | + | + | ++ | − | + | − |
| Normal cell (c) | − | − | − | − | − | − |
| Convalescent: | | | | | | |
| FC126 (c) | + | + | ND | + | + | − |
| FC126 (t) | + | − | ND | − | ND | − |
| MD-JM (c) [5] | + | + | + | ++ | ++ | − |
| MD-GA (c) [5] | + | + | + | ++ | ++ | − |
| MD-RPL-39 (c) [5] | + | + | + | ++ | ++ | − |
| MD-FC127 (c) [5] | + | − | + | ++ | ++ | − |
| Control: | | | | | | |
| Uninoculated (c) | − | − | − | − | − | − |
| Uninoculated (t) | − | − | ND | − | ND | − |

[1] Sera identified by immunizing antigen, letter in parentheses designates chicken (c) or turkey (t) origin.
[2] AGP and FA reactions graded according to intensity: ++ (intense), + (definite but less intense), − (negative).
[3] FA reactions controlled by absence of staining in cells between virus plaques.
[4] Virus neutralization based on 50 percent plaque reduction at final serum dilution of 1:20.
[5] Four separate strains of MDHV.

One of the properties of herpesvirus is that infected cell cultures develop discrete focal lesions which, when mature, consist of clusters of rounded, refractile, degenerating cells. These clusters or plaques induced by AHIV (all four isolates) are morphologically different from those induced by MDHV.

As further pointed out by Witter et al., ibid., page 536), the virus was identified as a herpesvirus on the basis of syncytical-type cytopathic features, type A intranuclear inclusion bodies, inhibition of plaque formation by 5-bromodeoxyuridine(5-BUDR), and the presence in the nucleus of infected cells of naked and enveloped herpesvirus-type particles. In addition, the absence of infectious virus in supernatant fluids and the low yield of virus from infected cells treated by sonication indicated that this herpesvirus belonged to Group B, as described by Melnick et al., in J. Immunol., 92, pp. 596–601 (1963).

Although both HVT and MDHV are cell-associated herpesviruses which produce a syncytial type of cytopathic effect on chicken kidney (CK) and duck embryo fibroblast (DEF) cell cultures, Witter et al. (ibid., page 536), explain that several differences are readily apparent. HVT can be differentiated from virulent isolates of MDHV because the former lacks pathogenicity for chicks, produces larger plaques with giant syncytia, forms plaques more rapidly, and because inclusion bodies are more frequent in infected cells. In addition, turkey cells, both in vitro and in vivo, are susceptible to HVT whereas turkey kidney cell cultures are not susceptible to virulent MDHV isolates and turkeys appear to be refractory to infection with 2 virulent MDHV isolates.

A paper by Okazaki, Purchase, and Burmester presented in part on Dec. 1–2, 1969, at Chicago, Ill., at the 50th Conference of Research Workers in Animal Diseases, for later publication in Avian Diseases, Vol. 14, No. 2, pp. 413–429 (May 1970), contains an extensive bibliography on the background of Marek's Disease, including, in addition to literature already cited, a number of references to U.S. Department of Agriculture assay procedures.

Other methods of obtaining the virus from the turkey would be equivalent, but blood and kidney cells are highly viruliferous and easy to obtain. Standard monolayer cell cultures such as chick kidney (CK), chicken embryo fibroblast (CEF), and duck embryo fibroblast (DEF) [Witter et al., Avian Diseases 13: 101–118 (1969)] are used to propagate the virus because they are easily infected and grow rapidly.

Under laboratory conditions, the first passage is accomplished by seeding the infected cells from heparinized blood or kidney tissue, washed with phosphate-buffered saline followed by trypsinization, onto 24- to 48-hour monolayers of CK, CEF, or DEF cultures which are then maintained for several days at 37° C. in a humidified atmosphere containing 3 to 4 percent carbon dioxide with periodic changes of growth medium. In all subsequent passages the supernatant cell culture medium is decanted or aspirated, trypsin is added to separate the cells which are then dispersed in a small amount of medium, and replated and grown on fresh monolayer cell cultures as described above.

Cells are passaged when 75 percent or more of the monolayer is cytopathically affected. The number of cells in a preparation are counted, and the extent of cell infection is determined [i.e., the cells when dispersed by trypsin can be easily seen and counted under a microscope, thereby giving a total quantitation of cell growth; or a known number of cells from the infected culture can be used to inoculate an uninfected monolayer of CK cells, or equivalent, which is then incubated for a specific period of time, usually 4 to 5 days, after which the number of plaques induced by the virus are counted giving a titer, a highly reproducible quantitation of infectivity, and reporting the titer as plaque forming units (PFU)].

The viruliferous cells are accordingly subjected to several serial passages in cell culture until a usable quantity of infected cells is obtained. A total of from five to 11 single and multiple passages are sufficient and at the same time will not cause attenuation of the virus. Several single passages, each of which increase the number of infected cells ten- to hundredfold, are usually required to provide the necessary quantity of cells for multiple passages, e.g., a blood or kidney cell sample having a titer of less than 10 PFU after going through six or seven single passages would have at least $10^5$ PFU which would be sufficient to inoculate several other cell cultures, each of which in turn could increase ten- to hundredfold and be subsequently divided.

The desired quantity and concentration of the vaccine obviously depends on the scale of the vaccination program and dose size. In normal laboratory practice, approximately $10^9$ cells will be produced, removed from the cultured medium, trypsinized, and resuspended in 100 ml. of culture medium containing 10 percent DMSO, giving a final vaccine having a concentration of about $5\times10^7$ virus-infected cells or $10^7$ PFU/ml.

This amount of vaccine will inoculate one million chickens with a dose of about $5\times10^3$ cells or $10^3$ PFU. The 100 ml. of vaccine is usually divided into 100 1-ml. vials, slow-frozen in liquid nitrogen, and stored in this manner until needed for immunization or for seed stock to produce more vaccine.

Dosages as low as $10^3$ PFU Uwere used successfully to give complete immunity, and dosages as high as $7\times10^4$ PFU were given without pathogenic effect. Nonpathogenicity of AHIV is natural and not the result of attenuation. After 11 serial passages, the virus remains unattenuated as evidenced by the fact that the A antigen is still present after the final passage. Since MDHV, a closely related herpesvirus, must be passaged at least 33 times to be attenuated, it is therefore expected that a mere 11 passages of AHIV would have no effect on the virus.

TABLE 2

| Vaccine[1] | Challenge[2] | % MD response[3] | Virus isolation[4] MD | Virus isolation[4] AHIV |
|---|---|---|---|---|
| AHIV | Contact | 0 | 4/8 | 8/8 |
| AHIV | Intra-abdom. | 0 | 5/7 | 6/7 |
| AHIV | None | 0 | 0/6 | 6/6 |
| None | Contact | 75.0 | 1/3 | 0/3 |
| None | Intra-abdom. | 62.5 | 1/3 | 0/3 |
| None | None | 0 | 0/6 | 0/6 |
| MD virus | | 57.1 | 1/2 | 0/2 |

[1]Vaccine batch No. 1 given 0.2 ml. intra-abdom. at 1 day of age. Each bird received $7.0\times10^4$ PFU.

[2]Birds were challenged intra-abdom. with MD whole blood or by placing inoculated MD-infected birds into the same isolator at 5 weeks of age.

[3]Experimental period was 20 weeks at which time all survivors were necropsied.

[4]Virus was isolated from the kidneys of survivors by the indirect chick kidney culture technique, and reported as ratio of survivors having virus to total number of survivors.

Table 2 shows the results of immunization with AHIV vaccine followed by challenge with live MD virus. It also shows another characteristic of AHIV. Vaccine virus does not stop the propagation of MDHV in the inoculated bird. Both AHIV and MDHV are isolated from chickens as much as 20 weeks old, but all signs of MD-induced pathogenicity are absent. Chickens showing no gross lesions are checked for microscopic lesions. Birds showing any MD-induced pathogenicity, including microscopic lesions, are reported as MD response.

A characteristic of the instant vaccine that differentiates it from attenuated MDHV vaccines is that live AHIV is produced cell-free, and the resulting vaccine is still effective as an immunological agent (see Example 7). All cell-free vaccines may be stored easily without resorting to the rigid storage conditions required by cell-associated virus vaccines.

Cell disruption may be effectuated by several methods, e.g., sonication or freeze-thaw. Sonication is preferred because of its easy and rapid operation. After a 20-second exposure to the output of a sonifier, no intact cells or nuclei were visible in the vaccine upon examination in a hemocytometer.

EXAMPLE 1

Samples of kidney tissue were removed from two 23-week-old turkeys (FC126), washed in phosphate-buffered saline, minced with scissors, washed again, and dispersed with 0.025 percent trypsin at 37° C. The resulting cellular suspension was added to a 24-hour monolayer CK culture (Witter et al., supra), and allowed to incubate at 37° C. for 1 day. At this time medium was changed and the culture allowed to incubate for an additional 15 days. Twenty-five milliliters of standard CK culture medium were used for each plate. The contents of the medium are as follows:

| | |
|---|---|
| Eagles basal medium (BME)[1] | 80% |
| Tryptose phosphate broth (30 g./l.) | 10% |
| 2.8% aq. Sodium bicarbonate | 3% |

[1] Biochemists' Handbook. D. VanNostrand Co., Inc., Princeton, New Jersey, 1961, p. 1,064.

| | |
|---|---|
| Bovine fetal serum | 5% |
| Penicillin (100 units/ml.) <br> Streptomycin (0.1 mg./ml.) <br> Mycostatin (25 units/ml.) | 6% |

At the end of the incubation period, the whole mass of cells was washed with phosphate-buffered saline, dispersed with 4 ml. of 0.05 percent trypsin, placed in tubes containing a quantity of calf serum equal to 10 percent of the tube volume, centrifuged at 1,000 × g., separated from the supernatant, resuspended in approximately 1 ml. of culture medium, and replated on a fresh 24-hour CK culture which was allowed to incubate for 5 days at 37° C. The FC126 virus isolate was propagated in CK cultures in the above manner for a total of six passages. Cells in the last passage were washed, trypsinized, centrifuged as described above, and preserved by dispersing them in a total volume of 1 ml. of culture medium containing 15 percent calf serum and 5 percent dimethyl sulfoxide. The suspension was slow-frozen to liquid nitrogen temperatures (−70° C.) to be used as seed cultures from which larger batches of vaccine are produced. The final suspension had a cellular concentration of $3.8 \times 10^6$ cell/ml. and a titer of $5 \times 10^4$ PFU/ml.

EXAMPLE 2

Samples of blood were removed from the same two turkeys as in Example 1. The blood was heparinized (20 units/ml.) and used directly to inoculate 24-hour monolayer DEF culture. The same procedures as in Example 1 for incubation and serial passages were followed for a total of seven passages. Contents of DEF growth culture medium is as follows:

| | | |
|---|---|---|
| Medium (199×10) | 40% | See Table 3 |
| Nutrient medium (F10×10) | 50% | |
| Tryptose phosphate broth (30 g./l.) | 5% | |
| 2.8% aq. Sodium bicarbonate | 3% | |
| Calf serum | 4% | |

After the seventh passage, two 1-ml. portions of vaccine were preserved as in Example 1, final concentration being $6.9 \times 10^6$ total cells containing $1.5 \times 10^5$ PFU of AHIV per milliliter.

EXAMPLE 3

Approximately $3.3 \times 10^4$ PFU of AHIV from Example 2 were seeded onto a confluent 24-hour DEF monolayer in each of six 150×25 mm. plastic culture dishes. The growth medium (25 ml./plate) was the same as in Example 2. The day after infection the medium was changed, and the cultures were held for two additional days. At this time, more than 75 percent of the DEF monolayer was cytopathically affected, and the cells were ready for transfer.

The transfer was accomplished by removing the growth medium, washing the cells once with phosphate-buffered saline (PBS), adding 4 ml. of 0.05 percent trypsin solution, and allowing to react for 5 minutes. The loosened cells were then

TABLE 3

| Component | Grams/liter 199 | Grams/liter F10 | Component | Mg./liter 199 | Mg./liter F10 |
|---|---|---|---|---|---|
| L-arginine (HCl) | 0.070 | 0.211 | FeSO$_4$·7H$_2$O | | 2.0 |
| L-histidine (HCl) | 0.020 | 0.021 | CuSO$_4$·5H$_2$O | | 0.004 |
| L-lysine HCl | 0.070 | 0.029 | ZnSO$_4$·7H$_2$O | | 0.051 |
| DL-tryptophane (L) | 0.020 | 0.0006 | Tween 80 | 5.0 | |
| DL-phenylalanine (L) | 0.050 | 0.005 | ATP | 1.0 | |
| DL-methionine (L) | 0.030 | 0.004 | Adenylic acid | 0.200 | |
| DL-serine (L) | 0.050 | 0.011 | Deoxyribose | 0.500 | |
| DL-threonine (L) | 0.060 | 0.004 | D-ribose | 0.500 | |
| DL-leucine (L) | 0.120 | 0.013 | Sodium acetate.3H$_2$O | 0.050 | |
| DL-isoleucine (L) | 0.040 | 0.003 | Adenine | 10.0 | |
| DL-valine (L) | 0.050 | 0.004 | Guanine | 0.300 | |
| DL-glutamic acid (L, anhy.) | 0.150 | 0.015 | Xanthine | 0.300 | |
| DL-aspartic acid (L) | 0.060 | 0.013 | Hypoxanthine | 0.300 | 4.00 |
| DL-alpha-alanine (L) | 0.050 | 0.009 | Uracil | 0.300 | |
| L-proline | 0.040 | 0.012 | Thymine | 0.300 | |
| L-hydroxyproline | 0.010 | | Thiamine (HCl) | 0.010 | 1.0 |
| Glycine | 0.050 | 0.008 | Pyridoxine HCl | 0.025 | 0.206 |
| L-glutamine | 0.100 | 0.146 | Riboflavine | 0.010 | 0.376 |
| L-cystine | 0.020 | | Pyridoxal HCl | 0.025 | |
| L-tyrosine | 0.040 | 0.002 | Niacin | 0.025 | |
| L-cysteine HCl (No HCl) | 0.0001 | 0.025 | Niacinamide | 0.025 | 0.615 |
| L-asparagine | | 0.013 | Ca pantothenate (D) | 0.010 | 0.715 |
| NaCl | 8.0 | 7.4 | i-Inositol | 0.050 | 0.541 |
| KCl | 0.400 | 0.285 | Ascorbic acid | 0.050 | |
| MgSO$_4$·7H$_2$O | 0.200 | 0.153 | Folic acid | 0.010 | 1.0 |
| Na$_2$HPO$_4$·7H$_2$O | 0.090 | 0.290 | p-Aminobenzoic acid | 0.050 | |
| KH$_2$PO$_4$ | 0.060 | 0.083 | Biotin | 0.010 | 0.024 |
| CaCl$_2$ (2H$_2$O) | 0.140 | 0.044 | Menadione | 0.010 | |
| NaHCO$_3$ | 0.350 | 1.2 | Gluthione | 0.050 | |
| Fe(NO$_3$)$_2$ | 0.0001 | | Vitamin A | 0.100 | |
| Dextrose | 1.000 | 1.100 | Calciferol | 0.100 | |
| Sodium pyruvate | | 0.110 | Cholesterol | 0.200 | |
| Phenol Red | 0.020 | 0.0012 | Vitamin B$_{12}$ | | 1.0 |
| Lipoic acid | | 0.0002 | Thymidine | | 1.0 |
| | | | Choline Cl | 0.500 | 0.698 |
| | | | Na$_2$-alpha-tocopherol phosphate | 0.010 | | placed in tubes containing a quantity of calf serum, equivalent to approximately 10 percent of the volume, to slow down the trypsin action. Following sedimentation by centrifugation at approximately 1,000×g. for 5 minutes, the cells were resuspended in growth medium, and all cells from the six plates were divided between 48 150×25 mm. plates containing 24-hour DEF monolayers.

Three days later, after manipulation as in the previous growth cycle and when the cytopathic effect was well advanced, the cells were harvested by trypsinization as described previously, suspended in medium containing 10 percent dimethyl sulfoxide, slow-frozen, and stored in liquid nitrogen. About 100 1-ml. vials containing approximately $1 \times 10^7$ total cells and $1 \times 10^6$ PFU per vial were obtained.

EXAMPLE 4

The product of Example 1 was processed in the manner described in Example 3. The resulting vaccine was stored in about 100 1-ml. vials containing $3.5 \times 10^5$ PFU/ml. of AHIV.

EXAMPLE 5

The product of Example 1 was passaged five more times in CK cultures to give a vaccine having an AHIV concentration of $6.5 \times 10^4$ PFU/ml.

EXAMPLE 6

The vaccines produced in Examples 3, 4, and 5 were used to inoculate chickens from 1 day to 3 weeks old which were subsequently challenged at 1 day to 5 weeks either by intraabdominal injections with MDHV or by contact with other chickens infected with MDHV. Dosages of AHIV vaccine were varied from 48 to $3 \times 10^4$ PFU in 0.2 ml., Table 4.

TABLE 4

| Example Number of vaccine used | Vaccination dose, PFU | Vaccination, days | Challenge, weeks | Route of challenge | Percent MD response |
|---|---|---|---|---|---|
| 3 | 1×10³ | 1 | 3 | Intra-abdominal | 0.0 |
| 3 | 1×10³ | 1 | 3 | Contact | 0.0 |
| 3 | 480 | 1 | 3 | do | 12.5 |
| 3 | 48 | 1 | 3 | do | 42.8 |
| 3 | 520 | 7 | (¹) | do | 0.0 |
| 3 | 690 | 14 | (¹) | do | 17.6 |
| 3 | 480 | 21 | (¹) | do | 55.0 |
| 4 | 3×10⁴ | 1 | 5 | Intra-abdominal | 0.0 |
| 4 | 3×10⁴ | 1 | 5 | Contact | 0.0 |
| 5 | 1×10⁴ | 1 | 2 | Intra-abdominal | 0.0 |
| 5 | 1×10⁴ | 1 | 3 | do | 0.0 |
| 5 | 1×10⁴ | 1 | 4 | do | 0.0 |
| 5 | 1×10⁴ | 1 | 5 | do | 0.0 |
| None | None | | 5 | do | 75.0 |
| Do | None | | 5 | Contact | 88.0 |
| Do | None | | 3 | Intra-abdominal | 40.0 |
| Do | None | | 3 | Contact | 70.0 |
| Do | None | | (¹) | Intra-abdominal | 100.0 |
| Do | None | | None | | 0.0 |

¹ 1 day.

EXAMPLE 7

A vaccine lot having $1 \times 10^6$ PFU/ml. was prepared from the product of Example 1 by four additional passages in CK cultures and three in CEF cultures. One portion of the above-mentioned vaccine was sonicated with a Bronwill Biosonik sonifier using a needle probe at an intensity of 70 for 20 seconds. After sonication no intact cells or nuclei were visible upon examination in a hemocytometer. A second portion of the vaccine was quick-frozen at −70° C. without dimethyl sulfoxide (DMSO). Intra-abdominal injections of 0.2 ml. of the sonicated and quick-frozen vaccines, each containing about 500 PFU/0.2 ml. were used to immunize 1-day-old chicks with the following results:

| Vaccine | Time of challenge with MDHV (intra-abdom.) | % MD response |
|---|---|---|
| sonicated | 3 weeks | 0 |
| quick-frozen without DMSO | 3 weeks | 0 |
| none | 3 weeks | 78 |

We claim:
1. A process for preparing a live unattenuated, cell-associated vaccine containing Antigen A, which is nonpathogenic in chickens and immunizes 1-to-21-day-old chicks against a lymphoproliferative disease of chickens known as Marek's Disease (MD), from live Avian Turkey Herpesvirus (HVT), also known as Avian Herpesvirus IV, a known virus isolated from infected turkeys, widespread in turkey flocks, said process comprising:
   a. inoculating a monolayer cell culture selected from the group consisting of chicken kidney, chicken embryo fibroblast, and duck embryo fibroblast cultures, with said Turkey Herpesvirus (HVT);
   b. incubating the inoculated cell culture until about 75 percent of the cells therein are infected with said virus;
   c. removing the cells from the resulting incubated culture, separating the cells with trypsin, and replating them on fresh monolayer cell cultures;
   d. serially passing them through not less than at least nine passage levels of cell cultures of the same type and in the same manner as described above until a useful quantity of viruliferous cells is obtained, said serial passage levels being terminated short of the higher passage levels at which Antigen A is lost, and the virus is attenuated; and
   e. dispersing said useful quantity of cells in the final passage with trypsin, and separating the cells from the liquid portion of the resulting dispersion, said separated cells constituting a vaccine characterized as essentially containing live, unattenuated, cell-associated Turkey Herpesvirus containing Antigen A.

2. The process of claim 1 further characterized in that the infected, dispersed cells, suspended in liquid culture medium, are disrupted, the disrupted cells are separated from the liquid medium and discarded, said retained liquid medium comprising a vaccine containing an unattenuated, live, cell-free virus.

3. The process of claim 1 further characterized in that the infected, dispersed cells, suspended in liquid culture medium are subjected to sonication until no intact cells or nuclei are visible upon examination in a hemocytometer.

* * * * *